United States Patent
Goodson et al.

(10) Patent No.: US 7,809,976 B2
(45) Date of Patent: Oct. 5, 2010

(54) SYSTEM AND METHOD FOR FAILOVER OF GUEST OPERATING SYSTEMS IN A VIRTUAL MACHINE ENVIRONMENT

(75) Inventors: Garth Richard Goodson, Sunnyvale, CA (US); Sai Susarla, Sunnyvale, CA (US); Randal Thelen, Sunnyvale, CA (US); Kiran Srinivasan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 494 days.

(21) Appl. No.: 11/742,209

(22) Filed: Apr. 30, 2007

(65) Prior Publication Data

US 2008/0270825 A1    Oct. 30, 2008

(51) Int. Cl.
    *G06F 11/00*    (2006.01)
(52) U.S. Cl. ............................................... 714/3; 714/5
(58) Field of Classification Search .................... 714/5, 714/6, 7, 8–12, 13, 3
    See application file for complete search history.

(56) References Cited

U.S. PATENT DOCUMENTS

| 6,671,773 | B2 | 12/2003 | Kazar et al. | |
|---|---|---|---|---|
| 6,728,896 | B1 * | 4/2004 | Forbes et al. | 714/4 |
| 7,039,828 | B1 | 5/2006 | Scott | |
| 7,213,246 | B1 * | 5/2007 | van Rietschote et al. | 718/1 |
| 7,266,637 | B1 * | 9/2007 | van Rietschote | 711/112 |
| 7,409,494 | B2 | 8/2008 | Edwards et al. | |
| 2003/0140281 | A1 * | 7/2003 | Fu et al. | 714/38 |
| 2004/0187106 | A1 * | 9/2004 | Tanaka et al. | 718/1 |

FOREIGN PATENT DOCUMENTS

| EP | 1 677 199 A2 | 7/2006 |
|---|---|---|
| WO | WO-2005/101181 A2 | 10/2005 |

OTHER PUBLICATIONS

"Notification of Transmittal of the International Search Report and the Written Opinion of the International Searching Authority, or the Declaration," International Filing Date: Apr. 28, 2008, International Application No. PCT/US2008/005442, Applicant: Network Appliance, Inc., Date of Mailing: Feb. 20, 2009, pp. 1-14.

* cited by examiner

*Primary Examiner*—Dieu-Minh Le
(74) *Attorney, Agent, or Firm*—Cesari and McKenna, LLP

(57) ABSTRACT

A system and method provides for failover of guest operating systems in a virtual machine environment. During initialization of a computer executing a virtual machine operating system, a first guest operating system allocates a first memory region within a first domain and notifies a second guest operating system operating in a second domain of the allocated first memory region. Similarly, the second guest operating system allocates a second region of memory within the second domain and notifies the first operating system of the allocated second memory region. In the event of a software failure affecting one of the guest operating systems, the surviving guest operating system assumes the identity of the failed operating system and utilizes data stored within the shared memory region to replay to storage devices to render them consistent.

20 Claims, 9 Drawing Sheets

SYSTEM AND METHOD FOR FAILOVER OF GUEST OPERATING SYSTEMS IN A VIRTUAL MACHINE ENVIRONMENT

FIELD OF THE INVENTION

The present invention relates to virtual machine systems and, more particularly, to failover of guest operating systems executing in a virtual machine environment.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

Storage systems may be interconnected as a cluster with the capability that if one of the cluster storage systems fails, the surviving storage system assumes the identity and continues to service data access requests directed to the failed storage system. Typically such systems include a cluster interconnect adapted to provide a dedicated hardware monitoring system between the storage systems. An example of such a clustered system is described in U.S. Pat. No. 7,039,828 entitled SYSTEM AND METHOD FOR CLUSTERED FAILOVER WITHOUT NETWORK SUPPORT, by John A. Scott issued May 2, 2006.

Typical clustered failover systems require access to dedicated cluster interconnect hardware mechanisms for effectuating certain operations, such as mirroring of the contents of memory. In such systems, when a write operation is received at a first cluster storage system or member, the contents of the write operation are both stored in a memory of the first cluster member and transported via a cluster interconnect to a second cluster member for storage in that member's memory. Thus, in the event of a failure of one of the members, the surviving cluster member may replay operations stored within its memory to bring the disks (or other storage devices) originally associated with the failed cluster member to a consistent state.

A virtual machine environment illustratively includes a computer, such as a storage system, executing a virtual machine operating system along with one or more "guest" operating systems to essentially implement virtual machines on the storage system. Each guest operating system may comprise a conventional operating system, such as Microsoft Windows or Linux, etc. or may comprise a specialized operating system, such as a storage operating system. Furthermore, it may be desirable to execute a plurality of guest operating systems (or a plurality of instantiations of a guest operating system) within a virtual machine environment configured in a clustered arrangement. Thus, a cluster may comprise of identical guest operating systems or may comprise of a heterogeneous pairing of guest operating systems, e.g., a Microsoft Windows based guest operating system paired with a Linux based guest operating system. Such a clustered configuration typically includes the capability that if one of the guest operating systems (instantiations) fails, the surviving instantiation of the guest operating system assumes the identity of the failed (instantiation of the) operating system thereby to enable continued processing of requests directed to the failed operating system (instantiation). However, when operating in a virtual machine environment, the virtual machine operating system typically controls the hardware of the storage system, thereby preventing use of dedicated cluster interconnect hardware by the guest operating systems. As a result, the guest operating systems are unable to effectuate certain operations, such as mirroring of the contents of their virtual machine memories. Accordingly, in response to a failure of one of the guest operating systems, the surviving guest operating system does not have a copy of received write data from the failed guest operating system, and thus, cannot replay such write requests to render storage devices consistent. As such, the utility of the clustered arrangement is reduced.

SUMMARY OF THE INVENTION

The present invention overcomes the disadvantages of the prior art by providing a system and method for failover of guest operating systems in a virtual machine environment configured in a clustered arrangement. In accordance with the present invention, the guest operating systems establish shared memory regions within domains of the operating systems. In response to an error condition resulting in a failure of a guest operating system, the surviving guest operating system may access data stored in the failed guest operating system's shared memory region.

Illustratively, during initialization of a computer executing a virtual machine operating system, a first guest operating system allocates a first memory region within a first domain and notifies a second guest operating system operating in a second domain of the allocated first memory region. Similarly, the second guest operating system executing allocates a second region of memory within the second domain and notifies the first operating system of the allocated second memory region. Notifications may occur via, for example, interprocess communication or via remote procedure calls (RPCs) between the two guest operating systems.

The first and second guest operating systems then utilize the allocated memory regions as shared memory regions, accessible by each operating system, for storage of data such as, for example, write data received from a client prior to storage on persistent storage devices. In the event of a software failure affecting one of the guest operating systems, the surviving guest operating system assumes the identity of the failed guest operating system and utilizes data stored within the shared memory region to replay to the storage devices to render them consistent. The surviving guest operating system may then continue servicing data access requests directed to the failed guest operating system.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

In accordance with an embodiment of the present invention, a first and second guest operating systems utilize allocated memory regions as shared memory regions, accessible by each guest operating system, for storage of data such as, for example, write data received from a client prior to storage on persistent storage devices, such as disks. In the event of a software failure affecting one of the guest operating systems, the surviving guest operating system assumes the identity of the failed guest operating system and utilizes data stored within the shared memory region to replay to the disks to render them consistent. The surviving guest operating system may then continue servicing data access requests directed to the failed guest operating system.

A. Storage System

Figure 1:
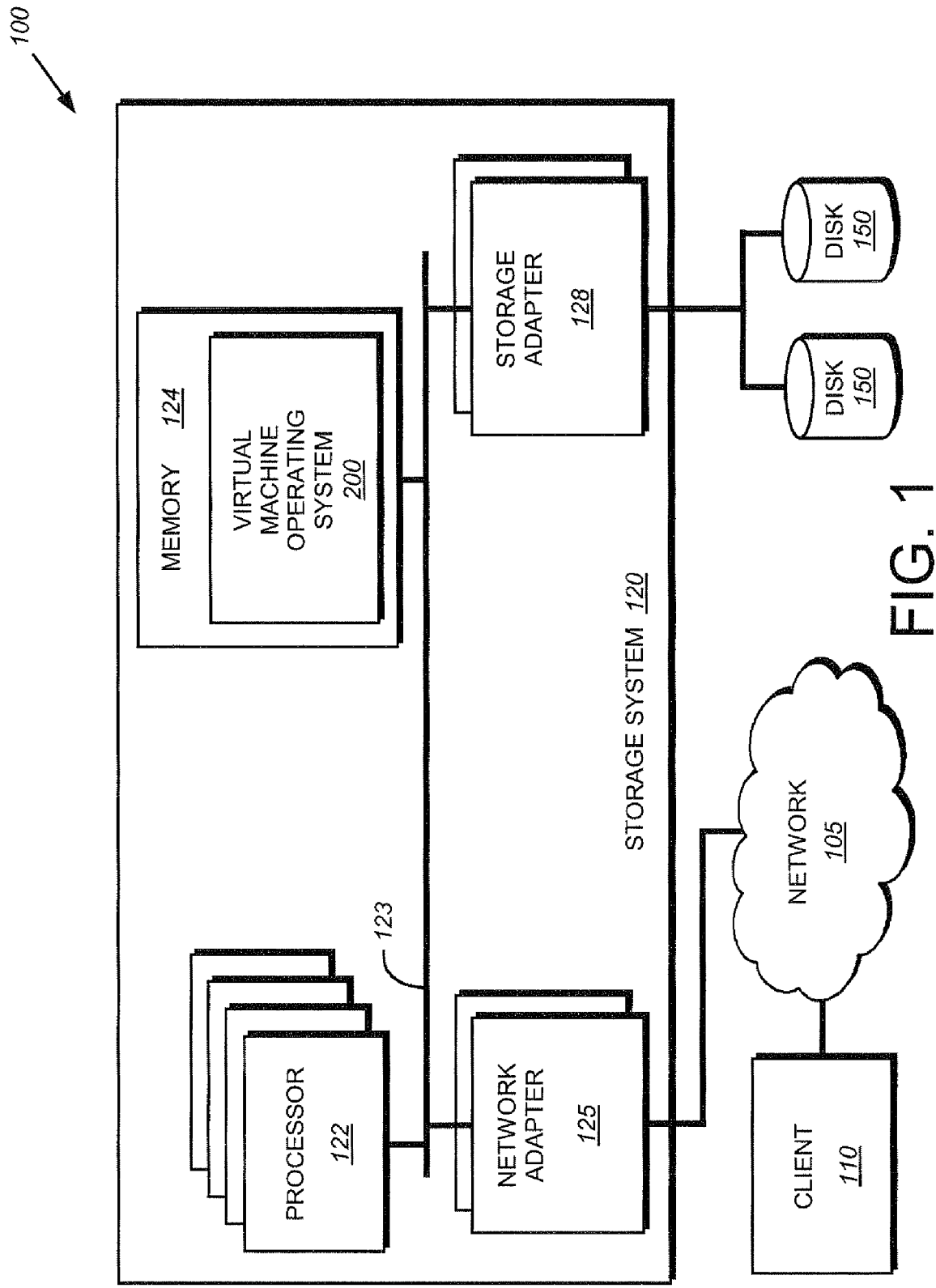
FIG. 1 is a schematic block diagram of an exemplary storage system environment in accordance with an illustrative embodiment of the present invention.

FIG. 1 is a schematic block diagram of a storage system 120 that illustratively comprises a plurality of processors 122, a memory 124, a network adapter 125 and a storage adapter 128 interconnected by a system bus 123. Illustratively, the storage system 120 may comprise a multi-processor computer that executes a virtual machine operating system 200, such as the illustrative Xen virtual machine hypervisor. It should be noted that while this description is written in terms of the Xen system, other virtual machine operating systems may be utilized in accordance with alternate embodiments of the present invention. As multi-processor computers or storage systems increase in processing power, it makes economic sense to execute a number of guest operating systems (or instantiations of a guest operating system) of the virtual machine operating system 200 instead of acquiring a number of physical hardware systems. As noted above, a cluster may comprise of identical guest operating systems or may comprise of a heterogeneous pairing of guest operating systems, e.g., a Microsoft Windows based guest operating system paired with a Linux based guest operating system. By utilizing a plurality of guest operating systems, appropriate redundancy is maintained for software failures; however, should the physical hardware system fail, all guest operating systems will also fail. To counteract such a failure, the storage system 120 may be interconnected with one or more storage systems as a cluster within a physical hardware arrangement. Furthermore, the virtual machine operating system 200 may be configured to enable guest operating system migration among the clustered storage systems.

The memory 124 illustratively comprises storage locations that are addressable by the processors and adapters for storing software program code and data structures associated with the present invention. The processor and adapters may, in turn, comprise processing elements and/or logic circuitry configured to execute the software code and manipulate the data structures.

The network adapter 125 comprises a plurality of ports adapted to couple the storage system 120 to one or more clients 110 over a network 105 embodied as point-to-point links, wide area networks, virtual private networks implemented over a public network (Internet) or a shared local area network. The network adapter 125 thus may comprise the mechanical, electrical and signaling circuitry needed to connect the storage system 120 to the network 105. Illustratively, the computer network 105 may be further embodied as an Ethernet network or a Fibre Channel (FC) network. Each client 110 may communicate with the storage system over network 105 by exchanging discrete frames or packets of data according to pre-defined protocols, such as TCP/IP.

The clients 110 may be general-purpose computers configured to interact with the system 120 in accordance with a client/server model of information delivery. That is, each client may request the services of the storage system, and the system may return the results of the services requested by the client, by exchanging packets over the network 105. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the virtual machine operating system 200 executing on the storage system 120 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage devices, such as disks 150. The storage adapter comprises a plurality of ports having input/output (I/O) interface circuitry that couples to the disks over an I/O interconnect arrangement, such as a conventional high-performance, FC link topology.

B. Virtual Machine Operating System

Figure 2:
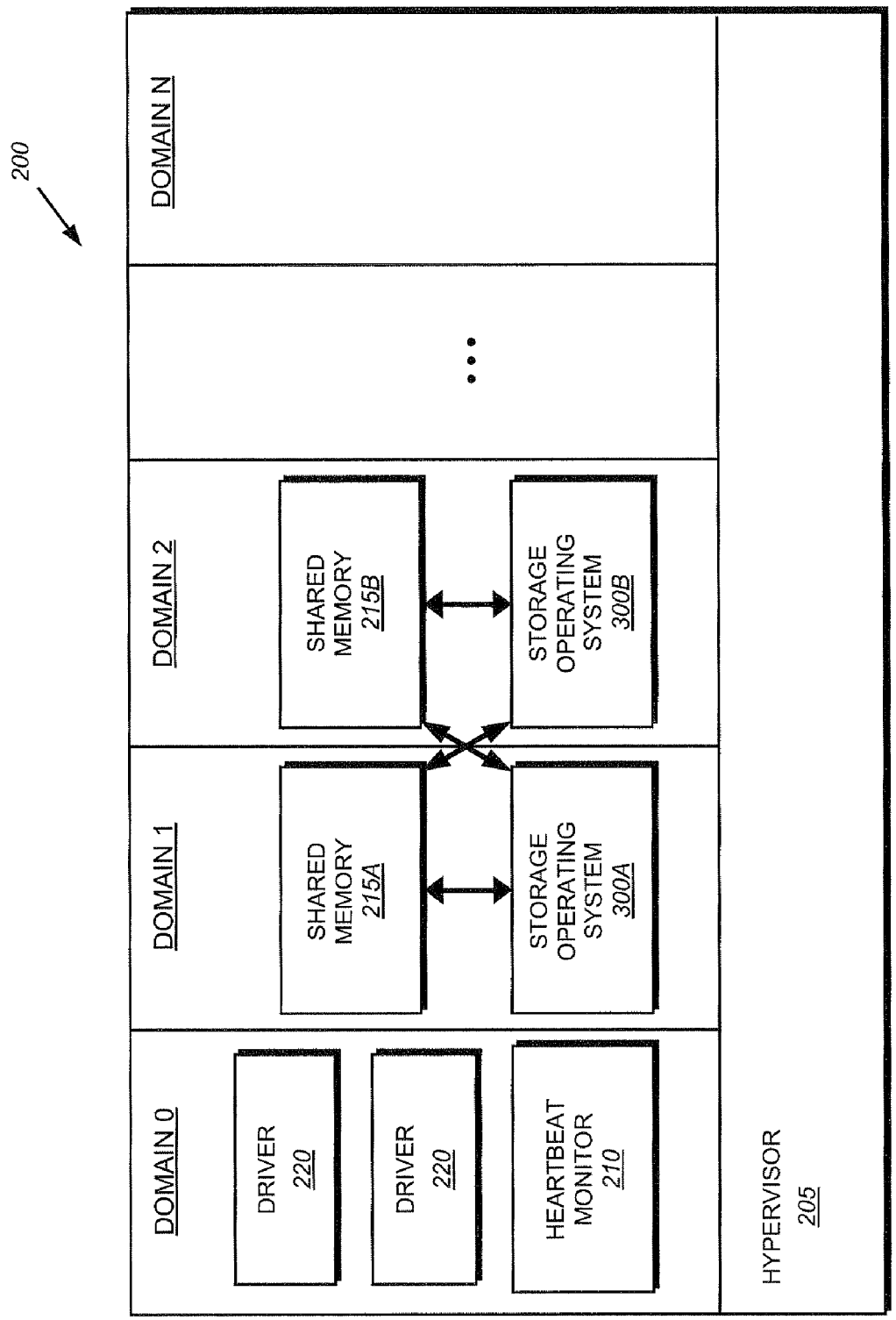
FIG. 2 is a schematic block diagram of an exemplary virtual machine operating system in accordance with an illustrative embodiment of the present invention.

FIG. 2 is a schematic diagram of an exemplary virtual machine operating system 200 in accordance with an illustrative embodiment of the present invention. As noted, the virtual machine operating system 200 illustratively comprises the Xen virtual machine operating system. However, it should be noted that the principles of the present invention may be utilized in other virtual machine operating systems. Thus, the principles of the present invention may be utilized with virtual machine operating systems available from Microsoft, VMware or the like. As such the description of the Xen operating system should be taken as exemplary only. Illustratively, the virtual machine operating system 200 comprises a hypervisor module 205 that masks low-level hardware operations from the guest operating systems executing within various domains of the virtual machine operating system 200.

Illustratively disposed over the hypervisor module 205 is a plurality of domains, for example, Domain 0, 1, 2, etc. As used herein, a hypervisor is a virtualization platform that permits a plurality of guest operating systems to execute on a computer at the same time. Each domain is representative of a virtual machine within which a guest operating system executes. In the illustrative embodiment of the Xen operating system, Domain 0 provides administrator functionality. Domain 0 illustratively executes a Linux based kernel along with one or more administrative modules, such as a heartbeat monitor 210. The heartbeat monitor 210 illustratively monitors the status of various guest operating systems, such as storage operating systems 300A,B organized in a cluster configuration. In response to detecting a failure in a guest operating system, the heartbeat monitor will alert the surviving guest operating system to ensure that appropriate failover operations occur. The heartbeat monitor may alert the surviving guest operating system using, e.g., a remote procedure call to the guest operating system. The heartbeat monitor may monitor the status of the guest operating systems by, e.g., monitoring a routine signal sent by each operating system. Should the guest operating system fail to send the signal, the heartbeat monitor may assume an error condition has occurred. Domain 0 may also include, for example, a plurality of software drivers 220 adapted to interface with various hardware components including, for example, the network adapters 125, storage adapters 128, etc. The drivers 220 illustratively provide an interface for I/O operations issued by the guest operating systems.

In the example shown in FIG. 2, Domain 1 and Domain 2 each execute a storage operating system 300 arranged in a cluster configuration. In accordance with the principles of the present invention, Domain 1 includes a shared memory region 215A, while Domain 2 includes a shared memory region 215B. Since the memory regions are shared, storage operating system 300A has access to shared memory region 215B, while storage operating system 300B has access to shared memory region 215A. Thus, in the event of, e.g., storage operating system 300A suffering an error condition, surviving guest operating system (storage operating system 300B) may access shared memory region 215A to replay stored write operations to ensure consistency among storage devices associated with the failed guest operating system.

C. Storage Operating System

In accordance with an illustrative embodiment of the present invention, the guest operating systems 300 are implemented as storage operating systems. However, it should be noted that the principles of the present invention may be utilized with other types of guest operating systems organized in a cluster arrangement. As such, the description of storage operating systems being utilized as the guest operating systems should be taken as exemplary only. The storage operating system 300 illustratively implements a write-anywhere file system that cooperates with one or more virtualization modules to "virtualize" the storage space provided by storage devices, such as disks. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of named data containers, such as blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
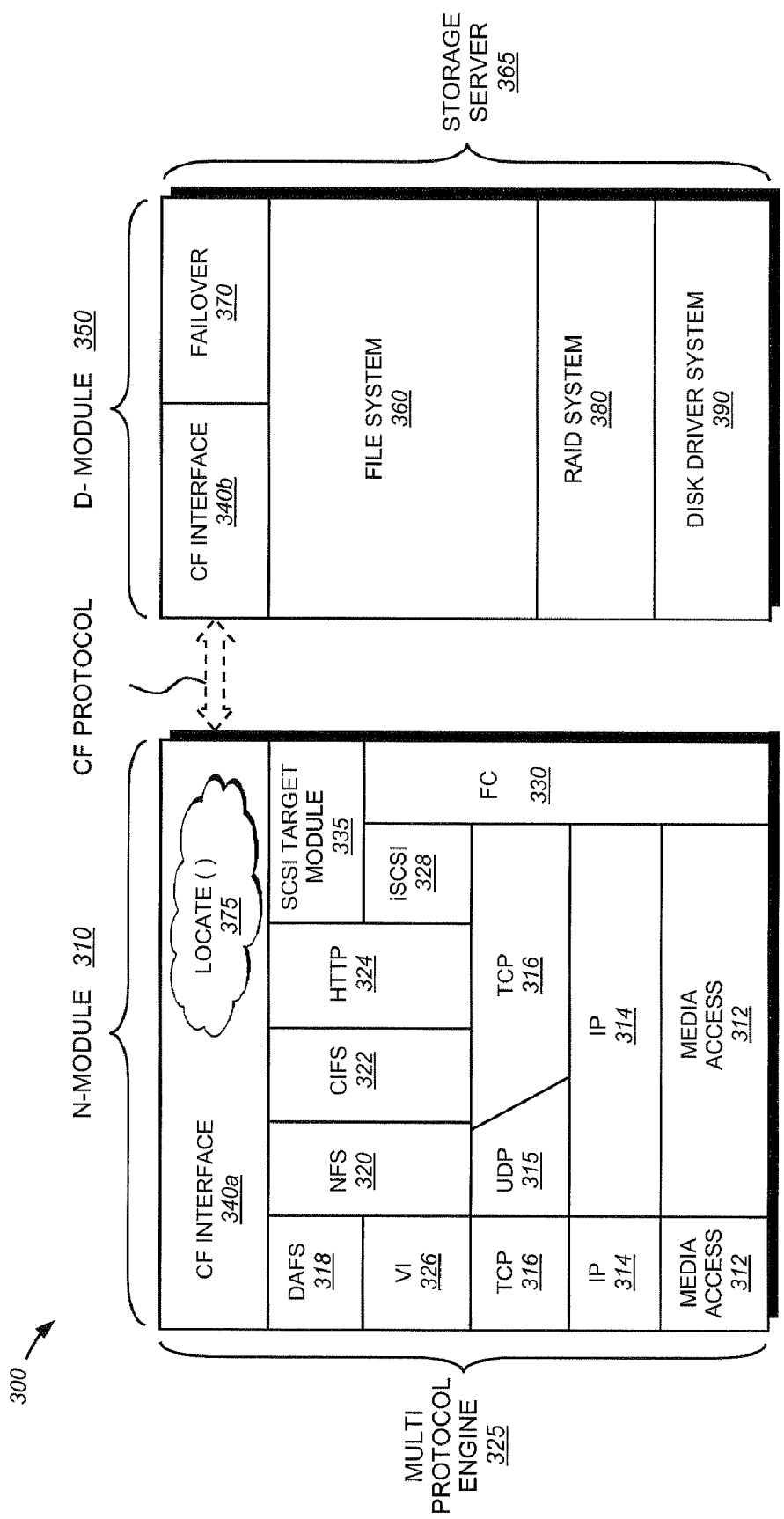
FIG. 3 is a schematic block diagram of an exemplary storage operating system that may be utilized as a guest operating system in a virtual machine environment in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the storage system using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system 120.

In addition, the storage operating system includes a series of software layers organized to form a storage server 365 that provides data paths for accessing information stored on the disks 150 of the storage system 120. To that end, the storage server 365 includes a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The storage operating system 300 also includes a failover monitor 370 that implements failover functionality in accordance with embodiments of the present invention. To that end, the failover monitor 370 may send routine heartbeat signals to the heartbeat monitor 210 to alert the monitor that the storage (i.e. guest) operating system 300 is functioning normally. Conversely, upon detecting a failure of a guest operating system 300, the heartbeat monitor 210 alerts the failover monitor 370 of the surviving guest operating system of the failure. The failover monitor may then effectuate failover operations including, e.g., assumption of the identity of the failed guest operating system, etc.

The file system 360 implements a virtualization system of the storage/guest operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 510 (see FIG. 5) in response to a user (system administrator) issuing commands to the guest operating system 300. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 110 is forwarded as a packet over the network 105 and onto storage system 120 where it is received at the network adapter 125. An appropriate network driver 220 of the virtual machine operating system 200 processes the packet and forwards it to the appropriate guest operating system 300. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 150 if it is not resident "in core", i.e., in memory 124. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 150 and loads the requested data block(s) in memory for processing by the node. Upon completion of the request, the guest operating system returns a reply to the driver 220, which forwards the reply over the network adapter 125 to the client 110 over the network 105.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC).

As used herein, the term "storage operating system" generally refers to the computer-executable code operable on a computer to perform a storage function that manages data access and may, in the case of a guest operating system 300, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the guest operating system 300 to service one or more disks 150. In addition, the multi-protocol engine 325 is embodied as N-module 310 to (i) perform protocol termination with respect to a client issuing incoming data access request packets over the network 105, as well as (ii) redirect those data access requests to any storage server 365 of the virtual machine operating system. Moreover, the N-module 310 and D-module 350 cooperate to provide a highly-scalable, distributed storage system architecture. To that end, each module includes a cluster fabric (CF) interface module 340a,b adapted to implement communication among the modules, including D-module-to-D-module communication.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-module 350 of the cluster 100. Notably, the CF interface modules 340 cooperate to provide a single file system image across all D-modules 350. Thus, any network port of an N-module that receives a client request can access any data container within the single file system image located on any D-module 350.

Further to the illustrative embodiment, the N-module 310 and D-module 350 are implemented as separately-scheduled processes of guest operating system 300; however, in an alternate embodiment, the modules may be implemented as pieces of code within a single operating system process. Communication between an N-module and D-module is thus illustratively effected through the use of message passing between the modules. A known message-passing mechanism provided by the guest operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in U.S. Patent Application Publication No. US 2002/0116593 entitled METHOD AND SYSTEM FOR RESPONDING TO FILE SYSTEM REQUESTS by Kazar et al., now issued as U.S. Pat. No. 6,671,773 on Dec. 30, 2003, the contents of which are hereby incorporated by reference.

The CF interface module 340 implements the CF protocol for communicating file system commands among the modules of the virtual machine operating system 200. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same domain or (ii) a remote procedure call (RPC) when communicating the command to a D-module residing on a different domain of the virtual machine operating system 200. In either case, the CF decoder of CF interface 340b on D-module 350 de-encapsulates the CF message and processes the file system command.

Figure 4:
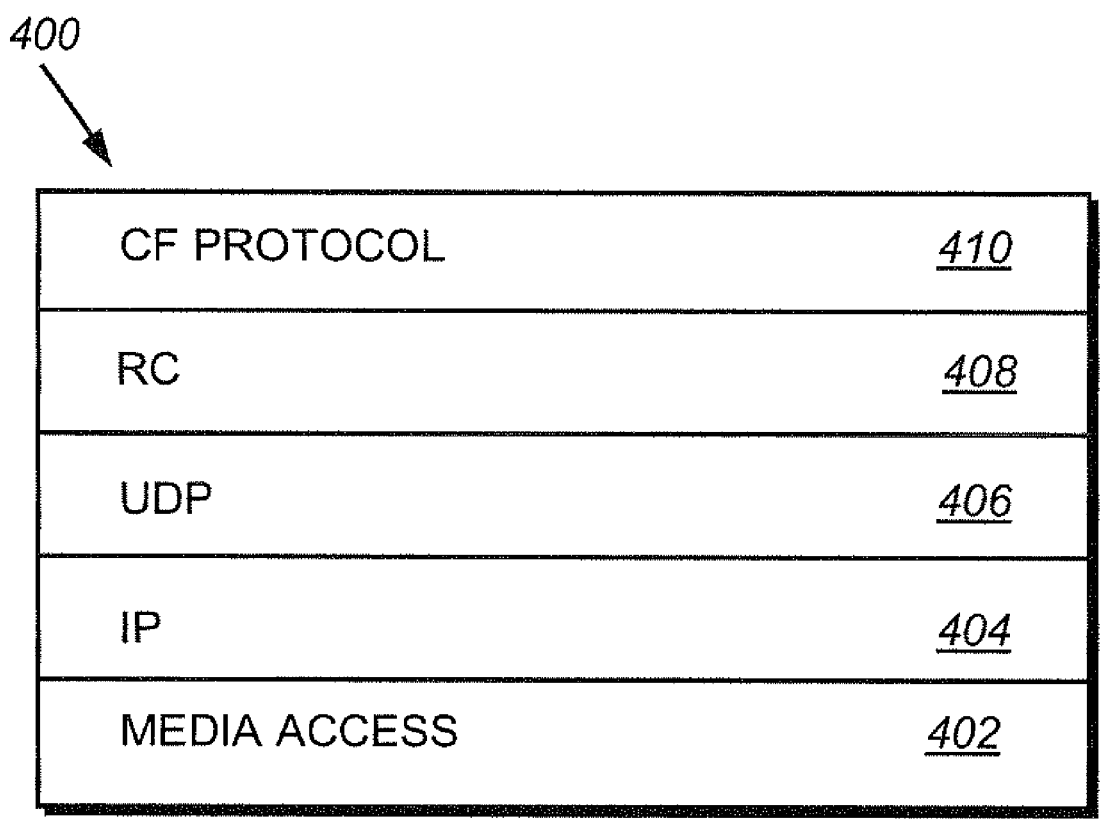
FIG. 4 is a schematic block diagram of an exemplary cluster fabric protocol data structure in accordance with an illustrative embodiment of the present invention.

FIG. 4 is a schematic block diagram illustrating the format of a CF message 400 in accordance with an embodiment of with the present invention. The CF message 400 is illustratively used for RPC communication between remote modules of different guest operating systems 300; however, it should be understood that the term "CF message" may be used generally to refer to LPC and RPC communication between modules of the virtual machine operating system 200. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the storage system 120; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

E. VLDB

Figure 5:
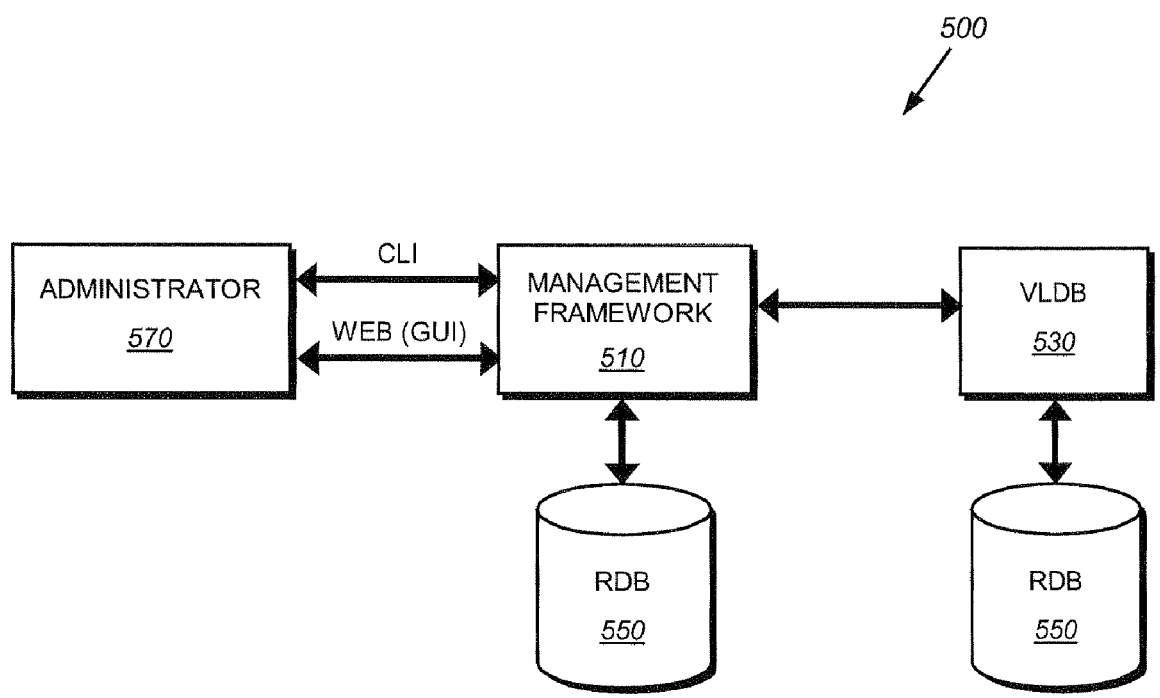
FIG. 5 is a schematic diagram illustrating a collection of management processes in accordance with an illustrative embodiment of the present invention.

FIG. 5 is a schematic block diagram illustrating a collection of management processes that execute as user mode applications 500 on each guest operating system 300 to provide management of configuration information (i.e. management data) for the guest operating system. To that end, the management processes include a management frame-work process 510 and a volume location database (VLDB) process 530, each utilizing a data replication service (RDB 550) linked as a library. The management framework 510 provides a user to an administrator 570 interface via a command line interface (CLI) and/or a web-based graphical user interface (GUI). The management framework is illustratively based on a conventional common interface model (CIM) object manager that provides the entity to which users/system administrators interact with the guest operating system, such as a storage operating system 300.

The VLDB 530 is a database process that tracks the locations of various storage components (e.g., virtual (flexible) volumes, aggregates, etc.) among various storage operating systems 300. Flexible volumes and aggregates are further described in U.S. patent application Ser. No. 10/836,817, entitled EXTENSION OF WRITE ANYWHERE FILE SYSTEM LAYOUT, by John K. Edwards, et al., now issued as U.S. Pat. No. 7,409,494 on Aug. 5, 2008, the contents of which are hereby incorporated by reference. Examples of such VLDB entries include a VLDB volume entry 600 and a VLDB aggregate entry 700.

Figure 6:
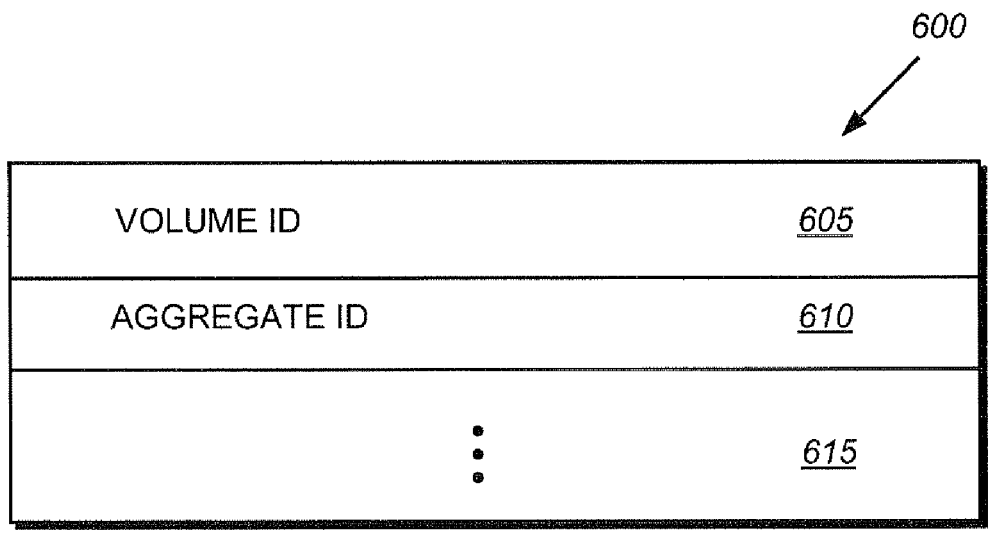
FIG. 6 is a schematic block diagram of a volume location database volume entry in accordance with an illustrative embodiment of the present invention.
Figure 7:
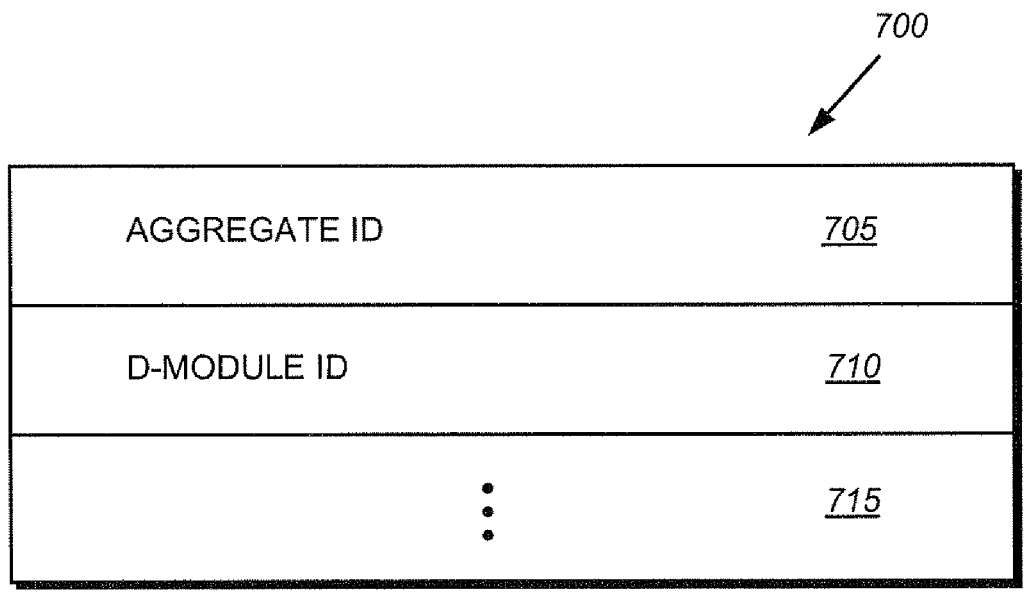
FIG. 7 is a schematic block diagram of a volume location database aggregate entry in accordance with an illustrative embodiment of the present invention.

FIG. 6 is a schematic block diagram of an exemplary VLDB volume entry 600. The entry 600 includes a volume ID field 605, an aggregate ID field 610 and, in alternate embodiments, additional fields 615. The volume ID field 605 contains an ID that identifies a volume used in a volume location process. The aggregate ID field 610 identifies the aggregate containing the volume identified by the volume ID field 605. Likewise, FIG. 7 is a schematic block diagram of an exemplary VLDB aggregate entry 700. The entry 700 includes an aggregate ID field 705, a D-module ID field 710 and, in alternate embodiments, additional fields 715. The aggregate ID field 705 contains an ID of a particular aggregate. The D-module ID field 710 contains an ID of the D-module hosting the particular aggregate identified by the aggregate ID field 705.

The VLDB illustratively implements a RPC interface, e.g., a Sun RPC interface, which allows the N-module 310 to query the VLDB 530. When encountering contents of a data container handle, the N-module sends an RPC to the VLDB process. In response, the VLDB 530 returns to the N-module the appropriate mapping information, including an ID of the D-module that owns the data container. The N-module caches the information in its configuration table and uses the D-module ID to forward the incoming request to the appropriate data container. All functions and interactions between the N-module 310 and D-module 350 are coordinated on a virtual machine operating system-wide basis through the collection of management processes and the RDB library user mode applications 500.

To that end, the management processes have interfaces to (are closely coupled to) RDB 550. The RDB comprises a library that provides a persistent object store (storing of objects) for the management data processed by the management processes. Notably, the RDB 550 replicates and synchronizes the management data object store access across all entities organized either the virtual machine operating system to thereby ensure that the RDB database image is identical on all of the domains. At system startup, each guest operating system records the status/state of its interfaces and IP addresses (those IP addresses it "owns") into the RDB database.

F. Failover Between Guest Operating Systems

The present invention provides a system and method for failover of guest operating systems in a virtual machine environment configured in a clustered arrangement. In accordance with the present invention, the guest operating systems establish shared memory regions within domains of the operating systems. In response to an error condition resulting in a failure of a guest operating system, the surviving guest operating system may access data stored in the failed guest operating system's shared memory region.

Illustratively, during initialization of a computer (e.g., storage system 120) executing a virtual machine operating system 200, a first guest operating system 300A allocates a first memory region 215A within a first domain and notifies a second guest operating system 300B operating in a second domain of the allocated first memory region. Similarly, the second guest operating system allocates a second region of memory 215B within the second domain and notifies the first operating system of the allocated second memory region. Notifications may occur via, for example, interprocess communication or via RPC between the two guest operating systems.

The first and second guest operating systems then utilize the allocated memory regions as shared memory regions 215A,B, accessible by each guest operating system 300, for storage of data such as, for example, write data received from a client 110 prior to storage on persistent storage devices, such as disks 150. In the event of a software failure affecting one of the guest operating systems, the surviving guest operating system assumes the identity of the failed guest operating system and utilizes data stored within the shared memory region 215 to replay to the disks to render them consistent. The surviving guest operating system may then continue servicing data access requests directed to the failed guest operating system.

Figure 8:
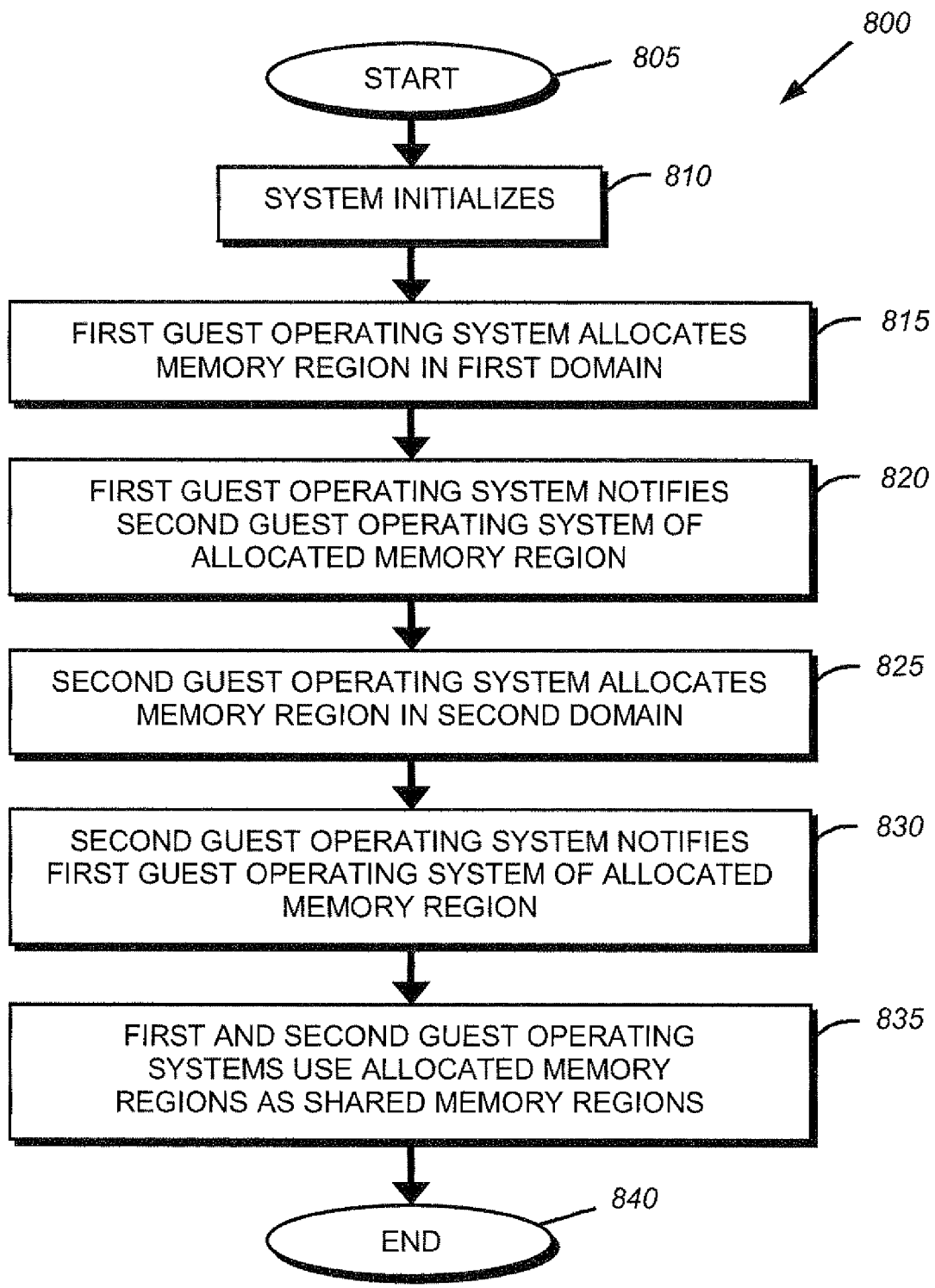
FIG. 8 is a flowchart detailing the steps of a procedure for initializing shared memory regions among guest operating systems in accordance with an illustrative embodiment of the present invention.

FIG. 8 is a flowchart detailing steps of a procedure 800 for initializing shared memory regions among guest operating systems in accordance with an illustrative embodiment of the present invention. The procedure 800 begins in step 805 and continues to step 810 where the storage system first initializes due to, e.g., a reboot procedure or a power cycle. During the initialization procedure, a first guest operating system 300A allocates a memory region in a first domain in step 815. This memory allocation may be performed using conventional memory allocation techniques of the guest operating system. The allocated memory region 215A is typically of sufficient size to be utilized in place of nonvolatile random access memory (NVRAM) as it is typically used in storage operating systems such as that described above in the above-incorporated U.S. Pat. No. 7,039,828. The first guest operating system then notifies a second guest operating system 300B of the allocated memory region in step 820. The first guest operating system may notify the second guest operating system using, for example, a RPC between the two systems. Illustratively, the hypervisor module 205 receives the RPC and routes it to the appropriate domain, of the virtual machine storage system 200, e.g., utilizing a loopback without requiring data to be physically sent over a network.

Concurrently, the second guest operating system 300B allocates a memory region 215B in the second domain in step 825 and notifies the first guest operating system of the allocated memory in step 830. Once the first and second guest operating systems have allocated memory and notified to their "partners", the guest operating systems begin utilizing the allocated memory regions as shared memory regions 215. By shared memory region it is meant generally that data that may be required by the other guest operating system is stored within the memory region, similar to the use of NVRAM in conventional clustering systems. Thus, for example, when new write data is received by one of the guest operating systems, the write data is stored in the appropriate shared memory region until such time as the data can be persistently stored on disk (or other storage devices). By storing the write data within a shared memory region, the partner guest operating system may access the data in the event of a software failure of the guest operating system, as described further below. The procedure 800 completes in step 840.

In the illustrative embodiment, the partner guest operating system only acquires read access to its partner's shared memory region. However, in alternative embodiments, the guest operating systems may grant read/write access to their partner. As such, the granting of read only access to a partner guest operating system should be taken as exemplary only.

Figure 9:
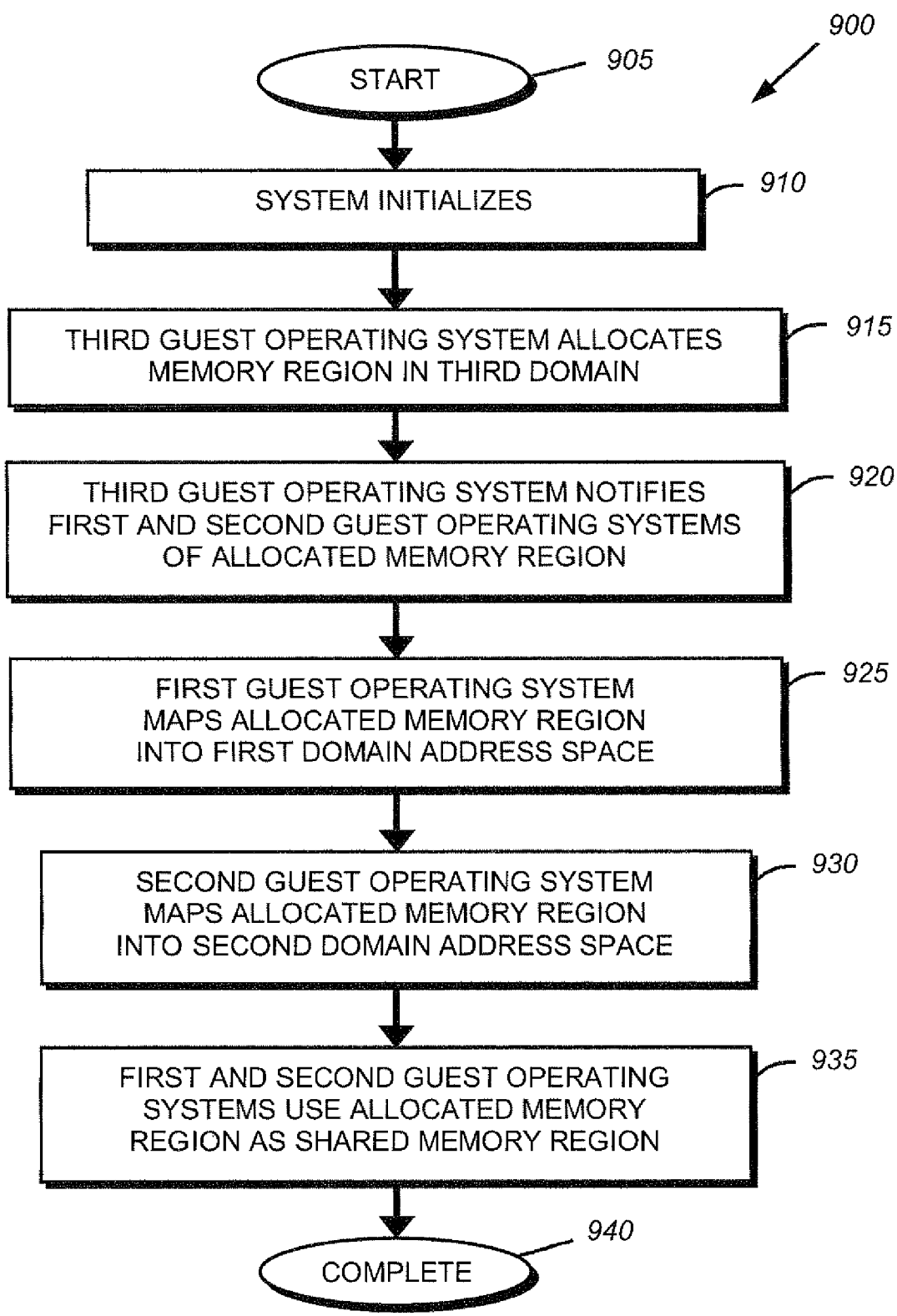
FIG. 9 is a flowchart detailing the steps of a procedure for initializing shared memory regions for use among guest operating systems in accordance with an illustrative embodiment of the present invention.

In accordance with an alternative embodiment of the present invention, a third guest operating system, operating in a third domain may allocate a memory region for use by two other guest operating systems. FIG. 9 is a flowchart detailing the steps of a procedure 900 for allocating memory regions in accordance with an illustrative embodiment of the present invention. The procedure 900 begins in step 905 and continues to step 910 where the storage system initializes due to, e.g., a power cycle. During the initialization, a third guest operating system, executing within a third domain, allocates a memory region within the third domain. The third guest operating system then notifies the first and second guest operating systems of the allocated memory region in step 920. In response to the notification, the first guest operating system maps the allocated memory region from the third domain into the address space of the first domain in step 925. Similarly, in step 930, the second guest operating system maps the allocated memory region from the third domain into the address space of the second domain. Then, in step 935, the first and second guest operating systems utilize the allocated memory within the third domain as a shared memory region. The procedure 900 completes in step 940.

Figure 10:
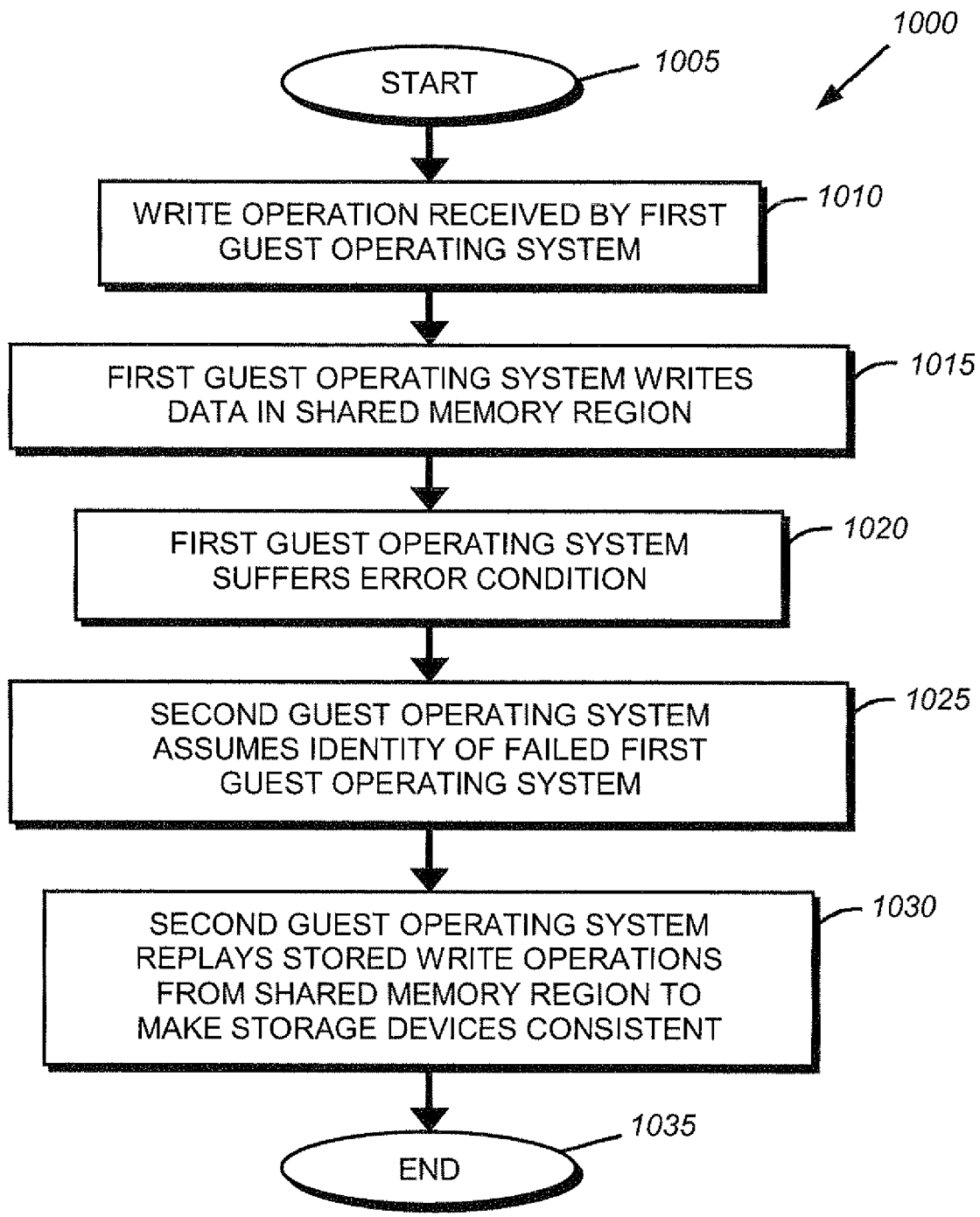
FIG. 10 is a flowchart of a procedure for performing a failover operation in accordance with an illustrative embodiment of the present invention.

FIG. 10 is a flowchart detailing the steps of a procedure 1000 for performing a failover operation among guest operating systems in accordance with an illustrative embodiment of the present invention. The procedure 1000 begins in step 1005 and continues to step 1010 where a write operation is received by a first domain guest operating system 300A. The first domain guest operating system stores the write data in the shared memory region 215A in step 1015. At some later point in time, the first guest operating system suffers an error condition in step 1020. An illustrative error condition may comprise a software error that necessitates a re-initialization of the guest operating system. During such a re-initialization, the guest operating system is unable to service data access requests. The second guest operating system 300B then assumes the identity of the failed first guest operating system in step 1025. The assumption of the identity may occur using conventional techniques such as that of reprogramming network interfaces to contain the network addresses previously associated with the failed domain guest operating system.

The second guest operating system 300B then replays the stored write operations from the shared memory region 215A to render the storage devices 150 consistent in step 1030. Thus, a write operation stored within the shared memory region 215A may be read by the surviving guest operating system 300B and written to the storage devices, such as disks 150, previously controlled by the failed guest operating system 300A. This replaying of data renders such disks 150 in a consistent state, thereby enabling the surviving guest operating system 300B to continue to service data access requests directed to the failed the guest operating system 300A. The procedure 1000 completes in step 1035. Upon completion of procedure 1000, the surviving guest operating system 300B may continue to serve data access requests directed to the failed guest operating system 300A.

The foregoing description has been directed to particular embodiments of this invention. It will be apparent, however, that other variations and modifications may be made to the described embodiments, with the attainment of some or all of their advantages. Additionally, the procedures, processes and/or modules described herein may be implemented in hardware, software, embodied as a computer-readable medium having program instructions, firmware, or a combination thereof. Furthermore, it should be noted that while the present invention has been written in terms of two member clusters, the principles of the present invention may be utilized in n-way clusters. As such, the description of two member clusters should be taken as exemplary only. Therefore, it is the object of the appended claims to cover all such variations and modifications as come within the true spirit and scope of the invention.

What is claimed is:

1. A method for enabling failover in a virtual machine environment, comprising:

allocating, by a first operating system, a first memory region;

notifying, by the first operating system, a second operating system of the first memory region;

allocating, by the second operating system, a second memory region;

notifying, by the second operating system, the first operating system of the second memory region;

utilizing, by the first operating system, the first memory region as a shared memory region for performing write operations by the first operating system;

utilizing, by the second operating system, the second memory region as a shared memory region for performing write operations by the second operating system; and replaying, by the second operating system, at least one write operation stored in the first memory region.

2. The method of claim 1 further comprising:

receiving the at least one write operation by the first operating system; and in response to receipt of the at least one write operation by the first operating system, storing write data associated with the at least one write operation in the first memory region.

3. The method of claim 1 further comprising assuming an identity of the first operating system by the second operating system, wherein the replaying and the assuming are in response to an error condition of the first operating system.

4. The method of claim 1 further comprising replaying, by the second operating system, the at least one write operation from the shared memory region of the first memory region to a set of storage devices.

5. The method of claim 4 wherein the set of storage devices comprise disks.

6. The method of claim 4 wherein the set of storage devices are associated with the first operating system.

7. The method of claim 1 wherein the first and the second operating systems comprise storage operating systems.

8. The method of claim 1 wherein the first and the second operating systems execute within separate domains within the virtual machine environment.

9. The method of claim 1 wherein the first and the second operating systems are instantiations of a same type of operating system.

10. The method of claim 1 wherein notifying the second operating system of the first memory region comprises sending a remote procedure call to the second operating system.

11. A computer readable medium containing executable program instructions executed by a processor, comprising:

program instructions that allocate, by a first operating system, a first memory region;

program instructions that notify, by the first operating system, a second operating system of the first memory region;

program instructions that allocate, by the second operating system, a second memory region;

program instructions that notify, by the second operating system, the first operating system of the second memory region;

program instructions that utilize, by the first operating system, the first memory region as a shared memory region for performing first write operations by the first operating system;

program instructions that utilize, by the second operating system, the second memory region as a shared memory region for performing second write operations by the second operating system; and program instructions that replay, by the second operating system, at least one second write operation stored in the first memory region.

12. A system for enabling failover in a virtual machine environment, comprising:
- means for allocating, by a first operating system, a first memory region;
- means for notifying, by the first operating system, a second operating system of the first memory region;
- means for allocating, by the second operating system, a second memory region;
- means for notifying, by the second operating system, the first operating system of the second memory region;
- means for utilizing, by the first operating system, the first memory region as a shared memory region for performing first write operations by the first operating system;
- means for utilizing, by the second operating system, the second memory region as a shared memory region for performing second write operations by the second operating system; and
- means for replaying, by the first operating system, at least one second write operation stored in the second memory region.

13. A system configured to enable failover in a virtual machine environment, comprising:
- a computer executing a virtual machine operating system;
- a first guest operating system executing within the virtual machine operating system, the first guest operating system configured in a cluster arrangement with a second guest operating system executing within the virtual machine operating system; and
  - a memory of the computer organized as a first shared memory region for use by the first guest operating system and a second shared memory region for use by the second guest operating system, and a set of storage devices coupled to the computer, wherein the first guest operating system is configured to utilize the first shared memory region to perform first write operations directed to the first guest operating system, the second guest operating system is configured to utilize the second shared memory region to perform second write operations directed to the second guest storage operating system, and the first guest operating system is configured to, in response to detecting an error condition of the second guest operating system, replay the second write operations stored in the second shared memory region to render the set of storage devices consistent.

14. The system of claim 13 wherein the first and the second guest operating systems comprise storage operating systems.

15. The system of claim 13 wherein the first shared memory region is associated with a first domain.

16. The system of claim 15 wherein the second shared memory region is associated with a second domain.

17. The system of claim 13 wherein the set of storage devices comprise disks.

18. The system of claim 13 further comprising a heartbeat monitor configured to detect an error condition of the first and the second guest operating systems.

19. The system of claim 13 wherein the first guest operating system is further configured to assume an identity of the second guest operating system.

20. The system of claim 13 wherein the first guest operating system is further configured to process data access requests direct to the second guest operating system.

* * * * *